United States Patent
Shibayama et al.

(10) Patent No.: US 11,088,381 B2
(45) Date of Patent: Aug. 10, 2021

(54) CELL UNIT

(71) Applicant: NISSAN MOTOR CO., LTD., Yokohama (JP)

(72) Inventors: Haruhiko Shibayama, Kanagawa (JP); Yosuke Fukuyama, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/635,354

(22) PCT Filed: Aug. 1, 2017

(86) PCT No.: PCT/JP2017/027796
§ 371 (c)(1),
(2) Date: Jan. 30, 2020

(87) PCT Pub. No.: WO2019/026168
PCT Pub. Date: Feb. 7, 2019

(65) Prior Publication Data
US 2020/0243889 A1    Jul. 30, 2020

(51) Int. Cl.
*H01M 8/2425* (2016.01)
*H01M 8/242* (2016.01)
(Continued)

(52) U.S. Cl.
CPC ....... *H01M 8/2425* (2013.01); *H01M 8/0232* (2013.01); *H01M 8/0271* (2013.01);
(Continued)

(58) Field of Classification Search
CPC ... H01M 8/2425; H01M 8/0271; H01M 8/242
See application file for complete search history.

(56) References Cited

U.S. PATENT DOCUMENTS

2003/0096147 A1    5/2003   Badding et al.
2003/0207166 A1    11/2003  Hara et al.
(Continued)

FOREIGN PATENT DOCUMENTS

GB    2 400 723 A    10/2004
JP    2005-251562 A   9/2005
(Continued)

*Primary Examiner* — James Lee
(74) *Attorney, Agent, or Firm* — Foley & Lardner LLP

(57) ABSTRACT

A cell unit CU includes a cell structure 1, a metal support plate 2 disposed on one side surface of the cell structure 1, and a frame 3 holding an outer peripheral part of the support plate 2. The cell structure 1 has a lamination of an anode electrode layer 4, an electrolyte layer 5, and a cathode electrode layer 6, in this order. The frame 3 includes a displacement guide 7 at least on one side surface of the frame 3. The displacement guide 7 has a coefficient of thermal expansion that is different from that of the frame 3 and is configured to make the frame 3 curve so that the cell structure 1 is concaved in accompany with thermal expansion. In the cell unit CU, a risk of concentration of tensile stress on the electrolyte layer 5 at the time of thermal expansion during operation is removed without reducing the strength of the frame 3, whereby occurrence of a crack and the like in the electrolyte layer 5 can be prevented beforehand.

12 Claims, 23 Drawing Sheets

(51) Int. Cl.
  *H01M 8/0232* (2016.01)
  *H01M 8/0271* (2016.01)
  *H01M 8/122* (2016.01)
  *H01M 8/2465* (2016.01)
  *H01M 8/124* (2016.01)

(52) U.S. Cl.
  CPC ........... *H01M 8/122* (2013.01); *H01M 8/242* (2013.01); *H01M 8/2465* (2013.01); *H01M 2008/1293* (2013.01)

(56) References Cited

U.S. PATENT DOCUMENTS

| | | |
|---|---|---|
| 2010/0021628 A1 | 1/2010 | Kimura |
| 2010/0098996 A1 | 4/2010 | Hwang et al. |
| 2010/0173217 A1 | 7/2010 | Brandner et al. |
| 2014/0170449 A1* | 6/2014 | Takahashi ............. H01M 2/348 429/62 |
| 2016/0093900 A1 | 3/2016 | Brandner et al. |
| 2016/0126564 A1 | 5/2016 | Nakai |
| 2019/0109333 A1* | 4/2019 | Okui ....................... H01M 8/12 |

FOREIGN PATENT DOCUMENTS

| | | |
|---|---|---|
| JP | 2008-34229 A | 2/2008 |
| JP | 2010-534901 A | 11/2010 |
| JP | 2013-33621 A | 2/2013 |
| WO | WO 2015/025642 A1 | 2/2015 |

\* cited by examiner

CELL UNIT

TECHNICAL FIELD

The present invention relates to a cell unit that constitutes a fuel cell, and in particular, the present invention relates to a cell unit including a cell structure, a metal support plate, and a frame that holds the support plate.

BACKGROUND ART

For conventional cell units, those described in Patent Documents 1 and 2 are known. Patent Document 1 discloses a fuel cell including a cell layer and a metal contact plate respectively on one side surface and the other side surface of a plate, which is produced by powder metallurgy. The cell layer has a lamination of an anode layer, an electrolyte layer, and a cathode layer, in sequence.

The plate has gas permeability at a center area corresponding to the cell layer and has gas impermeability at a circumferential area surrounding the center area. The plate is fixed to the contact plate by welding or other method, at an outer peripheral part of the circumferential area. The electrolyte layer is extended to the circumferential area of the plate and is air-tightly joined, whereby a gas barrier property between the anode layer and the cathode layer is secured.

Patent Document 2 discloses a fuel cell unit including a fuel cell and a separator. The fuel cell has a lamination of an air electrode, a solid electrolyte body, and a fuel electrode. The separator is joined to an outer peripheral part of the fuel cell. The separator separates circulation spaces for cathode gas and anode gas of the fuel cell from each other. This fuel cell unit includes a bent part that is formed in the separator, as seen from a cross section.

In this fuel cell unit, the bent part enables the separator to be deformed when warpage, undulation, or thermal deformation occurs in the thickness direction of the fuel cell. Therefore, this structure hardly causes generation of a crack in the electrode in the vicinity of an end of a lamination of the fuel cell and a collector.

CITATION LIST

Patent Document

Patent Document 1: JP 2010-534901T
Patent Document 2: JP 2013-033621A

SUMMARY OF INVENTION

Technical Problem

In the fuel cell (cell unit) disclosed in Patent Document 1, the metal plate (support plate) reinforces and supports the thin cell layer. However, the plate is deformed to curve in a way that the cell layer is on the inner side of the curve by thermal expansion during operation, because the plate has a coefficient of thermal expansion greater than that of the cell layer.

However, in this fuel cell, the contact plate suppresses deformation of the plate, because the plate is fixed to the contact plate (frame). Meanwhile, tensile stress occurs in the cell layer, and in particular, tensile stress tends to concentrate on the bent part on the outer periphery side of the electrolyte layer. For this reason, an improvement is necessary to prevent a crack or other damage from occurring in the electrolyte layer.

On the other hand, the fuel cell unit (cell unit) disclosed in Patent Document 2, the bent part of the separator absorbs deformation and can prevent generation of a crack in the vicinity of the end of the lamination of the fuel cell, when the fuel cell is deformed. However, in this fuel cell unit, the separator tends to have deterioration in the bent part, and strength of the entire separator is decreased by the bent part, whereby it is difficult to make the separator have a function of a frame for holding the fuel cell. Moreover, it is cumbersome to process this separator with the bent part. In addition, this separator requires a large occupying space in a narrow limited space in the cell.

The present invention has been made in view of these circumstances, and an object of the present invention is to provide a cell unit including a cell structure, a support plate, and a frame for holding them, in which a risk of concentration of tensile stress on an electrolyte layer at the time of thermal expansion during operation is removed without reducing strength of the frame, thereby occurrence of a crack and the like in the electrolyte layer are prevented in advance.

Solution to Problem

The cell unit of the present invention includes a cell structure having a lamination of an anode electrode layer, an electrolyte layer, and a cathode electrode layer in this order, a metal support plate disposed on one side surface of the cell structure, and a frame holding an outer peripheral part of the support plate. Moreover, in the cell unit, the frame includes a displacement guide at least on one side surface of the frame. The displacement guide has a coefficient of thermal expansion that is different from that of the frame and is configured to make the frame curve so that the cell structure will be concaved in accompany with thermal expansion.

Advantageous Effects of Invention

When the cell unit of the present invention is exposed to high temperature environment during operation, the support plate is deformed to curve in a way that the cell structure is on the inner side of the curve due to the difference in the coefficient of thermal expansion between the support plate and the cell structure, because the coefficient of thermal expansion of the support plate is greater than that of the cell structure. At this time, in the cell unit, the frame curves in a direction so that the cell structure will be on the concave side (be on the inner side), due to the difference in the coefficient of thermal expansion between the frame and the displacement guide provided at least on one side surface of the frame.

That is, the cell unit allows the support plate to curve by making the frame curve in a way that the cell structure is on the inner side of the curve, as the support plate curves in a way that the cell structure is on the inner side of the curve. In the cell unit with this structure, only a compressive load is applied to the electrolyte layer of the cell structure, and a tensile load is not applied to it. The electrolyte layer has a relatively low durability against a tensile load and has a relatively high durability against a compressive load.

Thus, in the cell unit, which includes the cell structure, the support plate, and the frame for holding them, a risk of concentration of tensile stress on the electrolyte layer at the time of thermal expansion during operation is removed without reducing the strength of the frame, thereby occurrence of a crack and the like in the electrolyte layer are prevented beforehand.

DESCRIPTION OF EMBODIMENTS

First Embodiment

Figure 1:
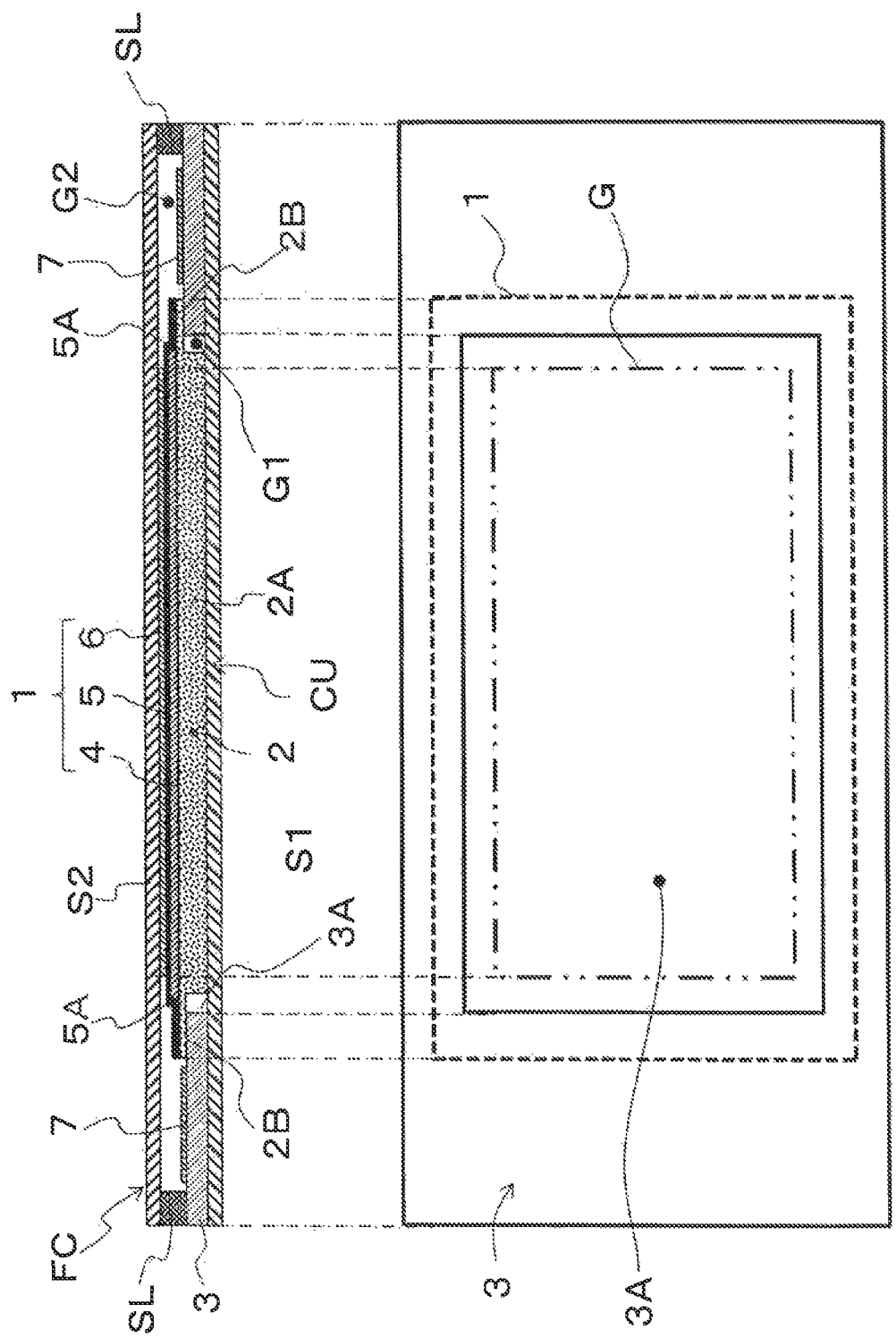
FIG. 1 is a cross-sectional view of a fuel cell and a plane view of a frame for illustrating a first embodiment of a cell unit according to the present invention.

A fuel cell FC illustrated in FIG. 1 is, for example, a solid oxide fuel cell, and contains a cell unit CU that constitutes a power generation element therein. The fuel cell FC includes the cell unit CU, separators S1 and S2, and a sealing part SL. The separators S1 and S2 are respectively disposed on an anode side and a cathode side of the cell unit CU. The sealing part SL air-tightly seals a space between an outer peripheral end part of a frame 3 of the cell unit CU and outer peripheral end parts of the separator S1 or S2. Each of the separators S1 and S2 is made of metal, such as stainless steel. The separator S1 forms an anode-side gas channel G1 between the separator S1 and the cell unit CU. The separator S2 forms a cathode-side gas channel G2 between the separator S2 and the cell unit CU.

The fuel cell FC illustrated in the figure has, for example, a flat rectangular shape, and a stacked fuel cells FC constitute a fuel cell stack. Although not illustrated in the figure, the fuel cell FC has manifold holes for supplying and discharging anode gas (hydrogen-containing gas) and cathode gas (oxygen-containing gas), respectively. The respective manifold holes communicate with each other in the stacked fuel cells FC, to form manifolds.

Figure 2A:
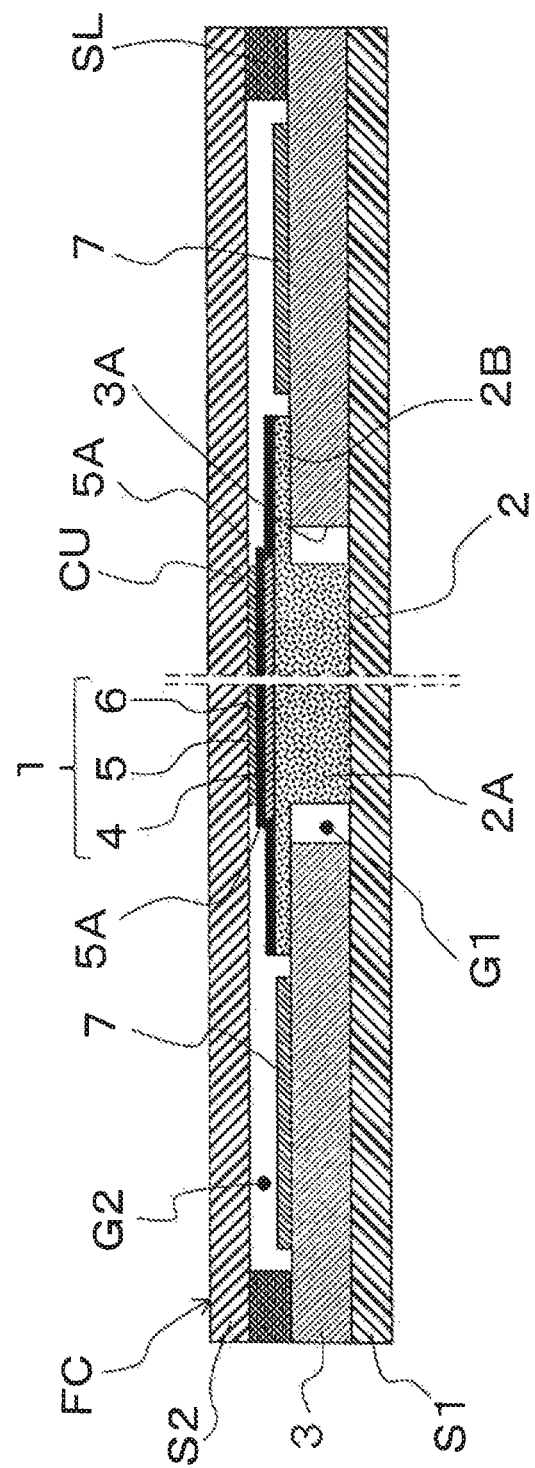
FIG. 2A is a cross-sectional view of a main part of the fuel cell illustrated in FIG. 1.
Figure 2B:
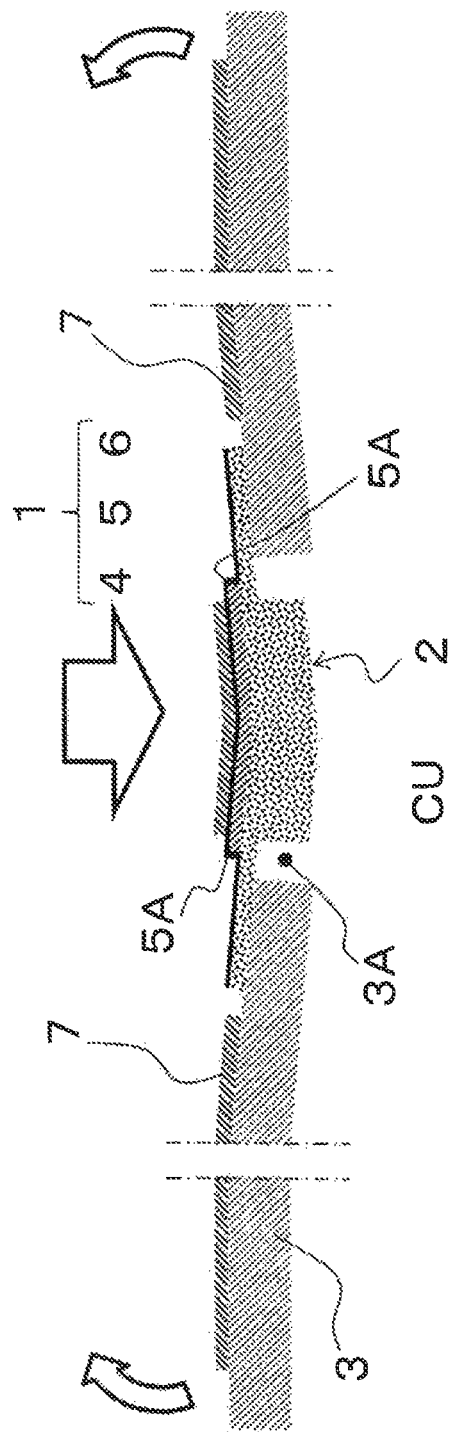
FIG. 2B is a cross-sectional view illustrating deformation of the cell unit at the time of thermal expansion.

As also illustrated in FIG. 2A and FIG. 2B, the cell unit CU includes a cell structure 1, a metal support plate 2 disposed on one surface side of the cell structure 1, and a frame 3 holding an outer peripheral part of the support plate 2. The cell structure 1 has a lamination of an anode electrode layer 4, an electrolyte layer 5, and a cathode electrode layer 6, in this order. Such a cell unit CU may be referred to as a "metal-supported cell" because mechanical strength is increased by the metal support plate 2.

The cell structure 1 has a lamination of the anode electrode layer 4, the electrolyte layer 5, and the cathode electrode layer 6, in this order, from a lower side in FIG. 2A and FIG. 2B. An area in which the layers 4 to 6 overlap each other is a power generation area G having electrochemical activity.

In a typical solid oxide fuel cell, for example, the anode electrode layer 4 uses a cermet of nickel and yttria-stabilized zirconia, the electrolyte layer 5 uses 8 mol % yttria-stabilized zirconia, and the cathode electrode layer 6 uses lanthanum strontium manganite.

The support plate 2 can be disposed on either of the electrode layers 4 and 6 sides in order to reinforce strength of the cell structure 1, but the support plate 2 is disposed on the anode electrode layer 4 side of the cell structure 1 to prevent oxidation. The support plate 2 integrally includes a center body part 2A and an outer peripheral part 2B surrounding the body part 2A. The body part 2A is in contact with the power generation area of the anode electrode layer 4. The body part 2A has gas permeability. On the other hand, the outer peripheral part 2B is formed thinner than the body part 2A and has gas impermeability.

The support plate 2 is made of a porous metal material, such as foamed metal. A peripheral part of the porous metal material is pressurized by, for example, press working, and consequently, a center part still having a porous composition serves as the body part 2A having gas permeability. On the other hand, the pressurized peripheral part having a dense composition serves as the outer peripheral part 2B having gas impermeability of the support plate 2.

The electrolyte layer 5 of the cell structure 1 is extended to the outer periphery side of the power generation area G and is joined to the outer peripheral part 2B of the support plate 2. Thus, a gas barrier property between the anode electrode layer 4 and the cathode electrode layer 6 is secured by the electrolyte layer 5. For this purpose, the electrolyte layer 5 has a bent part 5A at a position of an outer end part of the anode electrode layer 4, the bent part 5A being lowered by one step corresponding to the thickness of the anode electrode layer 4.

The frame 3 is made of a metal material, such as stainless steel. The frame 3 in this embodiment is a flat plate with a rectangular opening 3A and with a fixed thickness, as illustrated in the plane view on a lower side in FIG. 1. The opening 3A has a longitudinal and lateral dimension that is greater than that of the power generation area G but are smaller than that of the cell structure 1.

The frame 3 encloses the body part 2A of the support plate 2 in the opening 3A and is joined to a surface on a side opposite to the electrode (lower surface in FIG. 2A and FIG. 2B) of the outer peripheral part 2B of the support plate 2, on a surface on the cell structure 1 side (upper surface in FIG. 2A and FIG. 2B) of the peripheral edge part of the opening 3A. The frame 3 and the support plate 2 are joined by welding, various types of adhesives and the like.

The cell unit CU also includes a displacement guide 7 at least on one side surface of the frame 3. The displacement guide 7 has a coefficient of thermal expansion that is different from that of the frame 3 and is configured to make the frame 3 curve so that the cell structure 1 will be concaved in accompany with thermal expansion. In other words, the displacement guide 7 is configured to make the entire frame 3 curve so that the cell structure 1 will be on the inner side of the curve (on a concaved side).

In the cell unit CU of this embodiment, the displacement guide 7 has a coefficient of thermal expansion smaller than that of the frame 3 and is provided on a surface of the side of the frame 3 on which the cell structure 1 is disposed (upper surface in FIG. 2A and FIG. 2B). The displacement guide 7 is disposed in the frame 3 between the joint to the support plate 2 and the sealing part SL of the fuel cell FC. The displacement guide 7 may be continuously disposed over the entire peripheral part of the opening 3A or may be partially disposed.

More preferably, the displacement guide 7 may be formed of an insulating oxide material. As the material for the displacement guide 7, for example, an oxide of aluminum (Al), cobalt (Co), manganese (Mn), silicon (Si), zirconium (Zr), hafnium (Hf), yttrium (Y), cerium (Ce), lanthanum (La), praseodymium (Pr), or neodymium (Nd) and the like may be employed.

The displacement guide 7 is provided, for example, by applying a metal material on the frame 3 and burning the applied metal material, by preliminarily forming the displacement guide 7 into a sheet shape and joining it to the frame 3, and the like. As a result, the displacement guide 7 exemplified in the figure is formed in a layer on a main surface of the frame 3.

Figure 3:
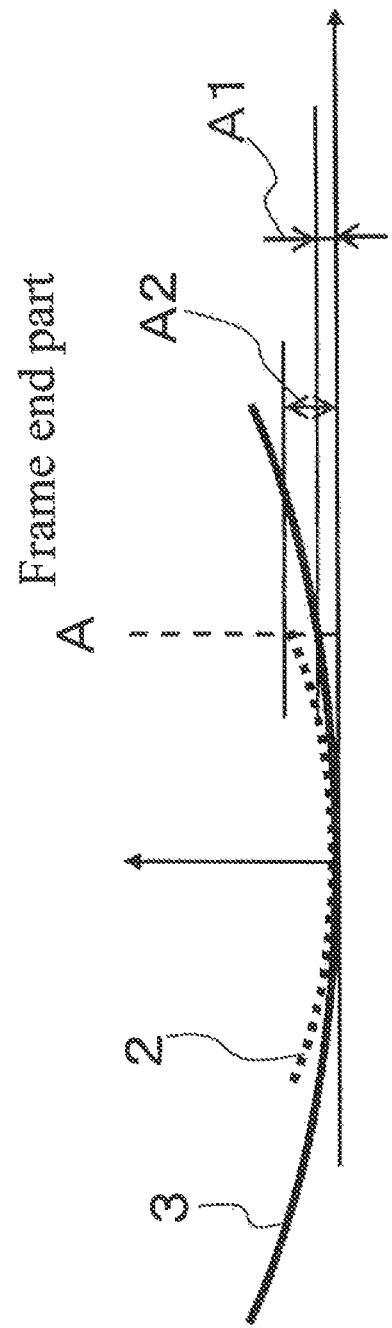
FIG. 3 is a graph illustrating a relationship between a displacement amount of the frame due to a displacement guide and a displacement amount of a cell structure due to a support plate.

As illustrated in FIG. 3, the cell unit CU is configured that a displacement amount A1 of the frame 3 with the displacement guide 7 at the time of thermal expansion is equal to or less than a displacement amount A2 of the support plate 2 with the cell structure 1 at the time of thermal expansion (A1≤A2), at an end part position A of the frame 3. These displacement amounts A1 and A2 can be set by selecting a material, size or the like of each member.

The displacement amount A1 of the frame 3 is a displacement amount when the frame 3 having one side joined to the displacement guide 7 is in a free state with no restrained part. Similarly, the displacement amount A2 of the support plate 2 is a displacement amount when the support plate 2 having one side joined to the cell structure 1 is in a free state with no restrained part.

The cell unit CU with such a configuration constitutes the fuel cell FC together with the separators S1 and S2 and the sealing part SL, as described above. The fuel cell FC allows anode gas and cathode gas to respectively circulate through the anode-side gas channel G1 and the cathode-side gas channel G2 during operation. As a result, the fuel cell FC makes the anode gas be supplied to the anode electrode layer 4 through the body part 2A of the support plate 2 and also makes the cathode gas be supplied to the cathode electrode layer 6. Thus, the fuel cell FC generates electrical energy due to electrochemical reaction in the power generation area G.

Meanwhile, in the cell unit CU exposed to high temperature environment during operation, the support plate 2 is deformed to curve in a way that the cell structure 1 is on the inner side of the curve, as illustrated in FIG. 2B, due to the difference in the coefficient of thermal expansion between the support plate 2 and the cell structure 1, because the coefficient of thermal expansion of the support plate 2 is greater than that of the cell structure 1. In the cell unit CU, in which the coefficient of thermal expansion of the displacement guide 7 is smaller than that of the frame 3, the frame 3 with the larger coefficient of thermal expansion curves so that the cell structure 1 will be concaved (be on the inner side), as illustrated by arrows in the figure. FIG. 2B illustrates an exaggerated displacement amount for easy understanding, and an actual displacement amount is minute. However, even though the displacement amount is minute, displacement applies a large load to the thin electrolyte layer 5.

That is, the cell unit allows the support plate 2 to curve by making the frame 3 curve in a way that the cell structure 1 is in the inner side of the curve, as the support plate 2 curves in a way that the cell structure 1 is in the inner side of the curve. Because of this, in the cell unit CU with this structure, only a compressive load is applied to the electrolyte layer 5 of the cell structure 1, and a tensile load is not applied to it. The electrolyte layer 5 has a relatively low durability against a tensile load and has a relatively high durability against a compressive load.

Figure 4:
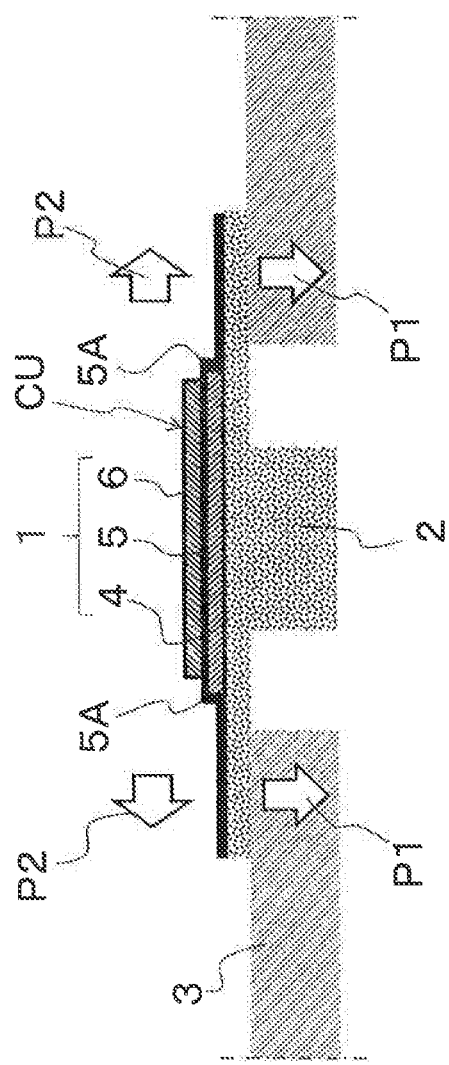
FIG. 4 is a cross-sectional view illustrating deformation at the time of thermal expansion in a structure without the displacement guide.

FIG. 4 illustrates a cell unit CU without the displacement guide 7 at the frame 3. When this cell unit CU is exposed to high temperature environment during operation, due to the coefficient of thermal expansion of the support plate 2 that is greater than that of the cell structure 1, the support plate 2 is deformed to curve in a way that the cell structure 1 is in the inner side of the curve, that is, deformed so that both ends spring up as illustrated in the figure.

In this cell unit CU, in which the support plate 2 is fixed to the frame 3, downward stress (arrow P1) occurs in the frame 3 against the upward (upward in the figure) stress generated at the both end parts of the support plate 2. This generates tensile stress (arrow P2) in an in-plane direction in the cell structure 1. The tensile stress P2 in the in-plane direction concentrates on the bent part 5A and the electrolyte layer 5 is prone to crack and the like, because the electrolyte layer 5 has low durability against a tensile load.

In contrast, in the cell unit CU of this embodiment, a tensile load is not applied to (tensile stress does not occur in) the electrolyte layer 5 as described above, and therefore, as a matter of course, stress does not concentrate on the bent part 5A.

Thus, the cell unit CU has a structure, in which a sufficient mechanical strength is secured by the support plate 2 for supporting the cell structure 1 and the frame 3 for holding the support plate 2. Moreover, in the cell unit CU, the risk of concentration of tensile stress on the electrolyte layer 5 at the time of thermal expansion during operation is removed without reducing the strength of the frame 3, whereby occurrence of a crack and the like in the electrolyte layer 5 can be prevented beforehand.

Therefore, the cell unit CU maintains the gas barrier property at a peripheral edge part of the cell structure 1 for a long time. In the fuel cell FC having this cell unit CU, a crack and the like are prevented from occurring in the electrolyte layer 5 beforehand, and the gas barrier property between the anode side and the cathode side is sufficiently maintained, whereby stable operation can be performed.

The cell unit CU has the displacement guide 7 in the frame 3, the displacement guide 7 being disposed between the joint to the support plate 2 and the sealing part SL of the fuel cell FC. Thus, the frame 3 curves while the joined condition of the joint to the support plate 2 and the joined condition (sealed condition) of the sealing part SL are well maintained, whereby the cell structure 1 is protected.

Moreover, the cell unit CU has the displacement guide 7, which has the coefficient of thermal expansion smaller than that of the frame 3, on the surface of the side, on which the cell structure 1 of the frame 3 is disposed. With this simple configuration, the frame 3 is deformed following the deformation of the support plate 2, thereby avoiding concentration of stress on the electrolyte layer 5.

In addition, in the cell unit CU, the displacement guide 7 is made of a material selected from insulating oxides. Therefore, compared with a case of using another metal, it is easy to increase the difference in the coefficient of thermal expansion between the displacement guide 7 and the frame 3, and the displacement guiding effect on the frame 3 is increased.

Furthermore, the cell unit CU is configured that the displacement amount A1 of the frame 3 with the displacement guide 7 at the time of thermal expansion is equal to or less than the displacement amount A2 of the support plate 2 with the cell structure 1 at the time of thermal expansion. That is, in the cell unit CU, which is configured so that the deformation amount B1 of the frame 3 will not exceed the deformation amount B2 of the support plate 2, the risk of excessive deformation of the support plate 2 and overloading on the cell structure 1 can be prevented in advance. Thus, in the cell unit CU, it is secured that a crack in the support plate 2, damage to the cell structure 1 and the like are prevented.

In order that the frame 3 can follow deformation of the support plate 2 in a cell unit CU, for example, the frame 3 may be thinned at the joint to the support plate 2 so as to be easily deformed. However, in this case, the original function of the frame 3 as a member to increase the mechanical strength of the cell unit CU is spoiled. On the other hand, in the cell unit CU of this embodiment, the displacement guide 7 is employed, whereby a crack and the like are prevented from occurring in the electrolyte layer 5 in advance, while the original strength and function of the frame 3 are maintained.

FIG. 5A, FIG. 5B, FIG. 6A, FIG. 6B, FIG. 7A, FIG. 7B, FIG. 8A, FIG. 8B, FIG. 9A, FIG. 9B, FIG. 10A, FIG. 10B, FIG. 11A, FIG. 11B, FIG. 12A, FIG. 12B, FIG. 13A and FIG. 13B illustrate second to tenth embodiments of the cell unit of the present invention. In each of the following embodiments, the same constitutional parts as in the first embodiment are denoted by the same reference signs, and detailed descriptions thereof are omitted.

Second Embodiment

Figure 5A:
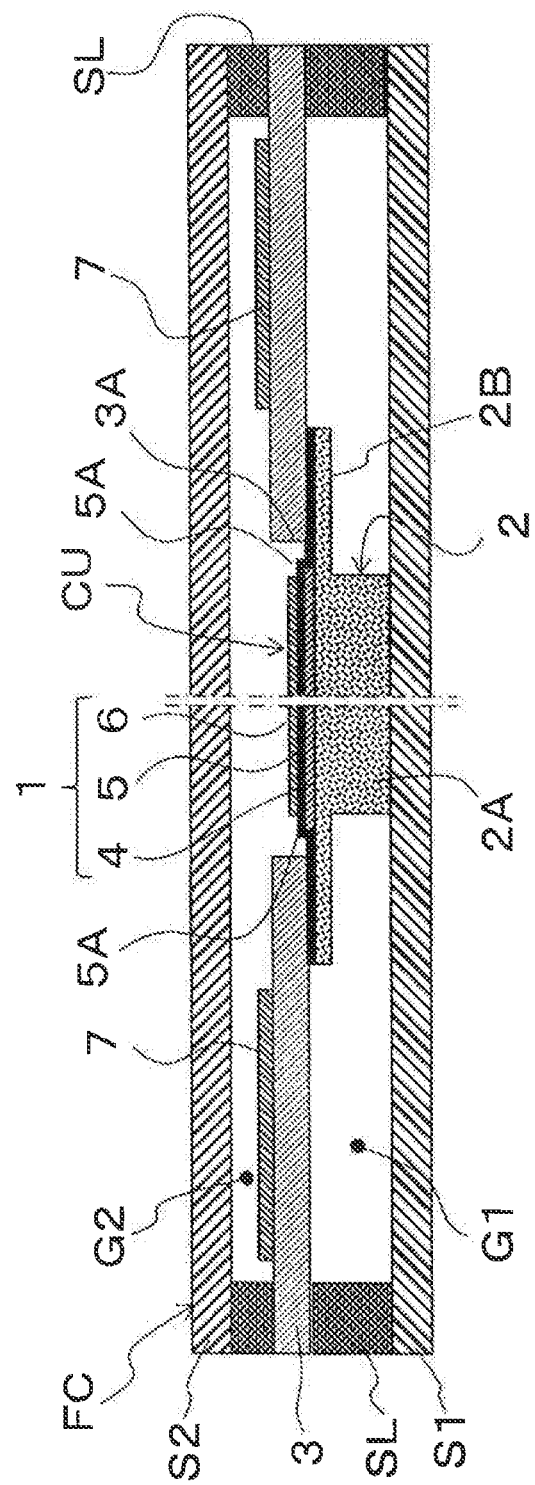
FIG. 5A is a cross-sectional view of the main part of the fuel cell for illustrating a second embodiment of the cell unit according to the present invention.
Figure 5B:
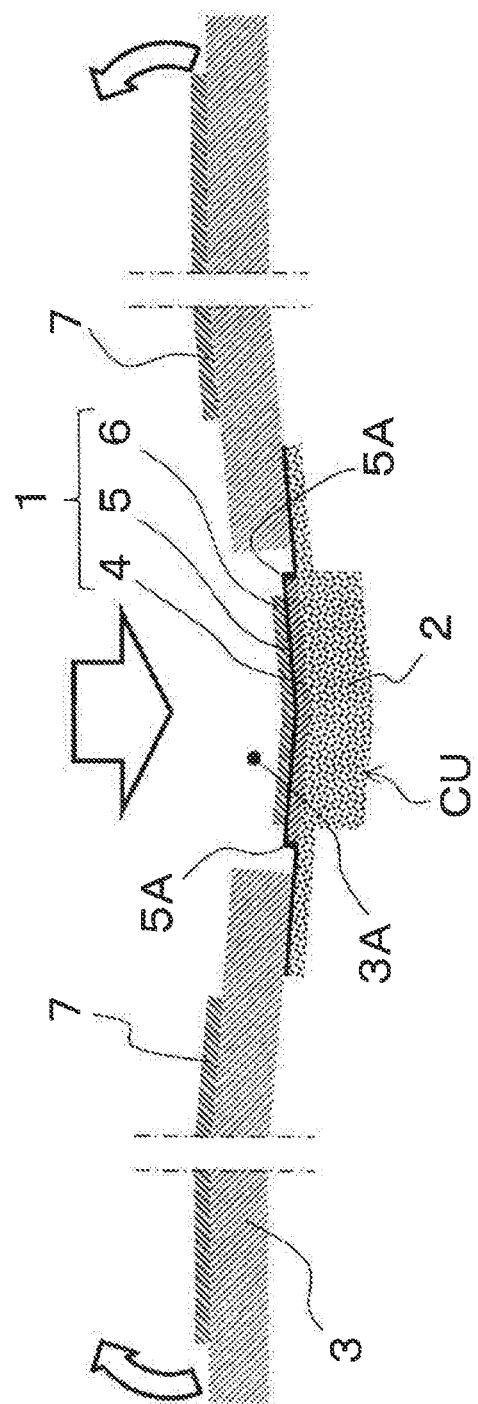
FIG. 5B is a cross-sectional view illustrating deformation of the cell unit at the time of thermal expansion.

FIG. 5A and FIG. 5B illustrate a second embodiment of the cell unit of the present invention. In the cell unit CU of the first embodiment described above, the surface on the side opposite to the electrode of the support plate 2 and the surface on the cell structure 1 side of the frame 3 are joined together. On the other hand, in the cell unit CU of this embodiment, a surface on the electrode side (upper surface in the figure) of the outer peripheral part 2B of the support plate 2 and the surface on the cell structure 1 side (lower surface in the figure) of the peripheral edge part of the opening 3A of the frame 3 are joined together. Thus, the cell unit CU illustrated in the figure has the structure, in which the electrolyte layer 5 is disposed between the support plate 2 and the frame 3.

The fuel cell FC having this cell unit CU is provided with the sealing part SL between the outer peripheral end parts of the anode-side separator S1 and the frame 3 and between the outer peripheral end parts of the frame 3 and the cathode-side separator S2.

When the cell unit CU with such a configuration is exposed to high temperature environment during operation, as illustrated in FIG. 5B, the support plate 2 curves in a way that the cell structure 1 is on the inner side of the curve, and the frame 3 also curves in a way that the cell structure 1 is on the inner side of the curve, accordingly. Thus, the cell unit CU has a structure in which a sufficient mechanical strength is secured by the support plate 2 and the frame 3. Moreover, in the cell unit CU, the risk of concentration of tensile stress on the electrolyte layer 5 at the time of thermal expansion during operation is removed without reducing the strength of the frame 3, whereby occurrence of a crack and the like in the electrolyte layer 5 can be prevented beforehand.

Moreover, the cell unit CU has the displacement guide 7, which has the coefficient of thermal expansion smaller than that of the frame 3. With this simple configuration, the frame 3 is deformed following the deformation of the support plate 2, thereby avoiding concentration of stress on the electrolyte layer 5. Furthermore, the cell unit CU of this embodiment, which has the electrolyte layer 5 interposed between the support plate 2 and the frame 3, has a further improved gas barrier property between the anode electrode layer 4 and the cathode electrode layer 6.

Third Embodiment

Figure 6A:
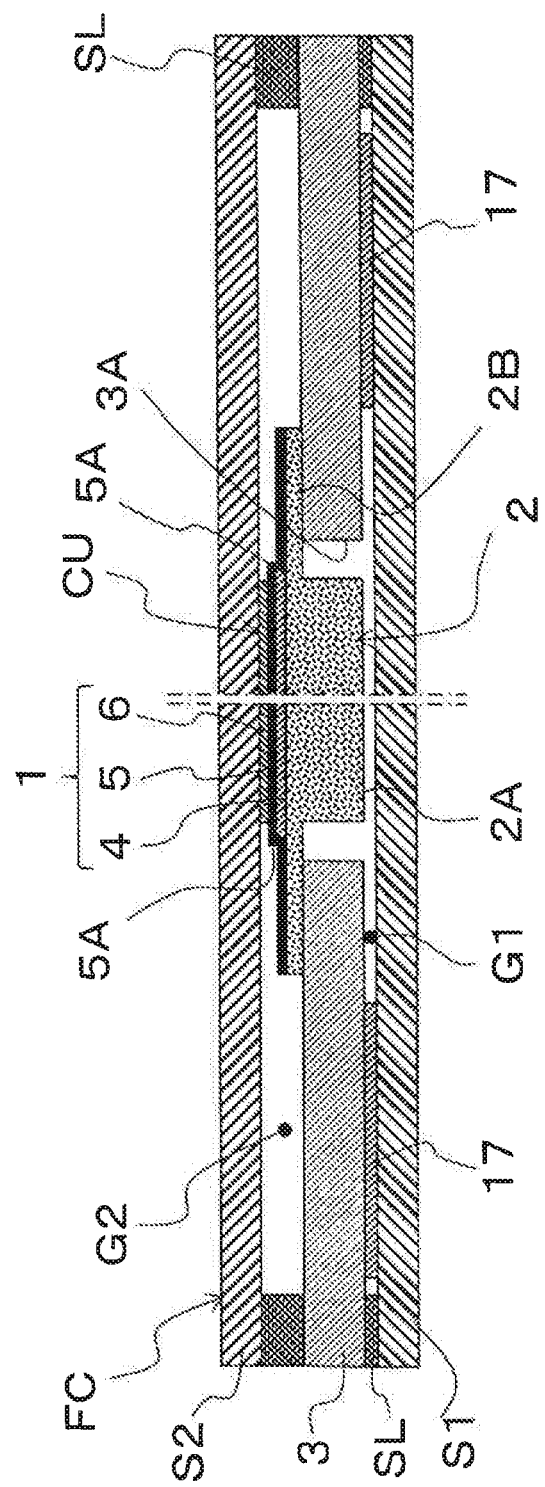
FIG. 6A is a cross-sectional view of the main part of the fuel cell for illustrating a third embodiment of the cell unit according to the present invention.
Figure 6B:
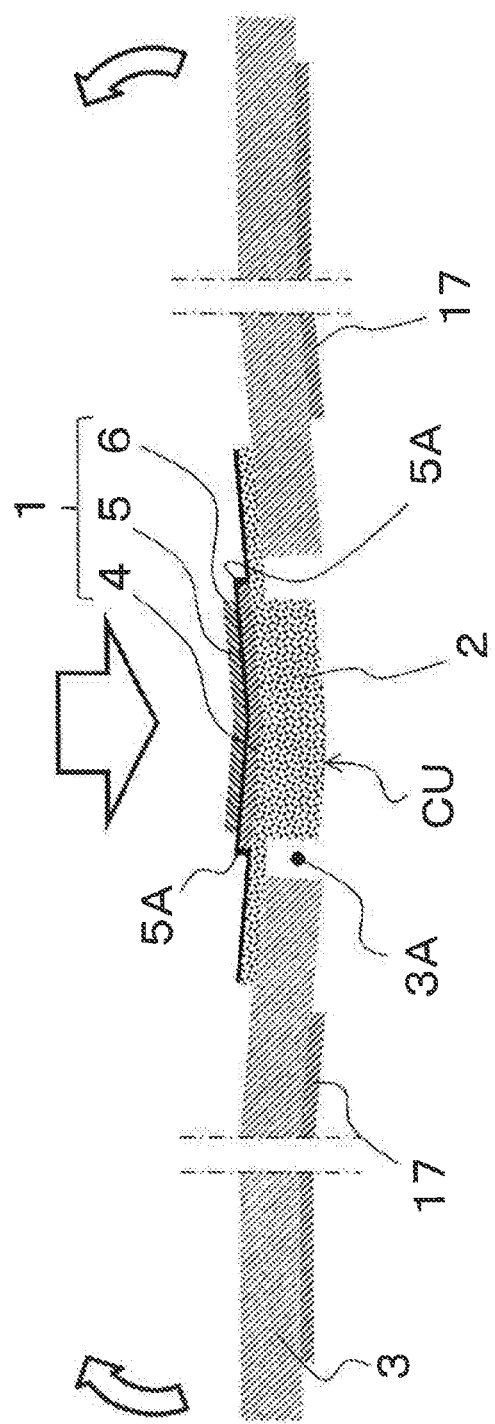
FIG. 6B is a cross-sectional view illustrating deformation of the cell unit at the time of thermal expansion.

FIG. 6A and FIG. 6B illustrate a third embodiment of the cell unit of the present invention. In the cell unit CU of the first embodiment, the displacement guide 7 having the coefficient of thermal expansion smaller than that of the frame 3 is disposed on the surface on the cell structure 1 side of the frame 3. On the other hand, in the cell unit CU of this embodiment, a displacement guide 17 having a coefficient of thermal expansion greater than that of the frame is disposed on a surface opposite to the side of the frame 3 on which the cell structure 1 is disposed (lower surface in the figure).

More preferably, the displacement guide 17 may be formed of an insulating oxide material. As the material for the displacement guide 17, for example, an oxide of aluminum (Al), cobalt (Co), manganese (Mn), silicon (Si), zirconium (Zr), hafnium (Hf), yttrium (Y), cerium (Ce), lanthanum (La), praseodymium (Pr), or neodymium (Nd) and the like may be employed.

In this cell unit CU, the magnitude relationship of the coefficient of thermal expansion between the frame 3 and the displacement guide 17 is reverse to that in the first embodiment, and the disposition relationship of the displacement guide 17 relative to both surfaces of the frame 3 is also reverse to that in the first embodiment. Therefore, when the cell unit CU is exposed to high temperature environment during operation, as illustrated in FIG. 6B, the support plate 2 curves in a way that the cell structure 1 is on the inner side of the curve, and the frame 3 also curves in a way that the cell structure 1 is on the inner side of the curve, accordingly.

Thus, the cell unit CU has a structure in which a sufficient mechanical strength is secured by the support plate 2 and the frame 3. Moreover, in the cell unit CU, the risk of concentration of tensile stress on the electrolyte layer 5 at the time of thermal expansion during operation is removed without reducing the strength of the frame 3, whereby occurrence of a crack and the like in the electrolyte layer 5 can be prevented beforehand.

Moreover, the cell unit CU has the displacement guide 17, which has the coefficient of thermal expansion greater than that of the frame 3. Thus, as in the case of the first embodiment, with this simple configuration, the frame 3 is deformed following the deformation of the support plate 2, thereby avoiding concentration of stress on the electrolyte layer 5.

Fourth Embodiment

Figure 7A:
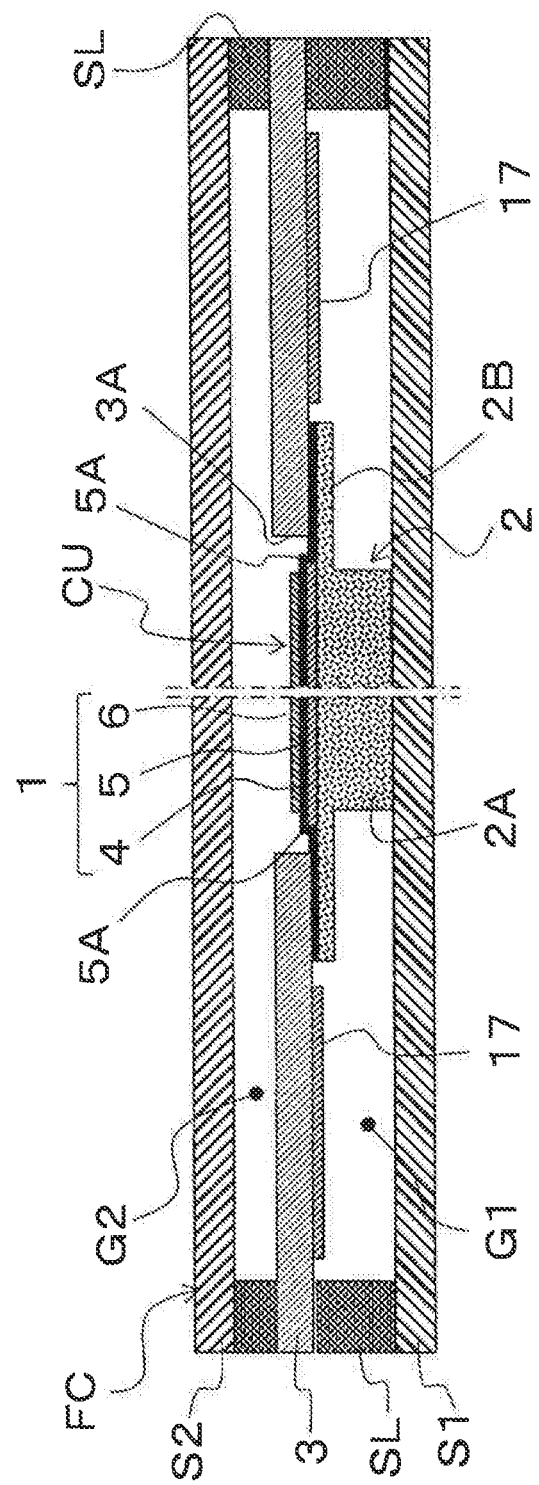
FIG. 7A is a cross-sectional view of the main part of the fuel cell for illustrating a fourth embodiment of the cell unit according to the present invention.
Figure 7B:
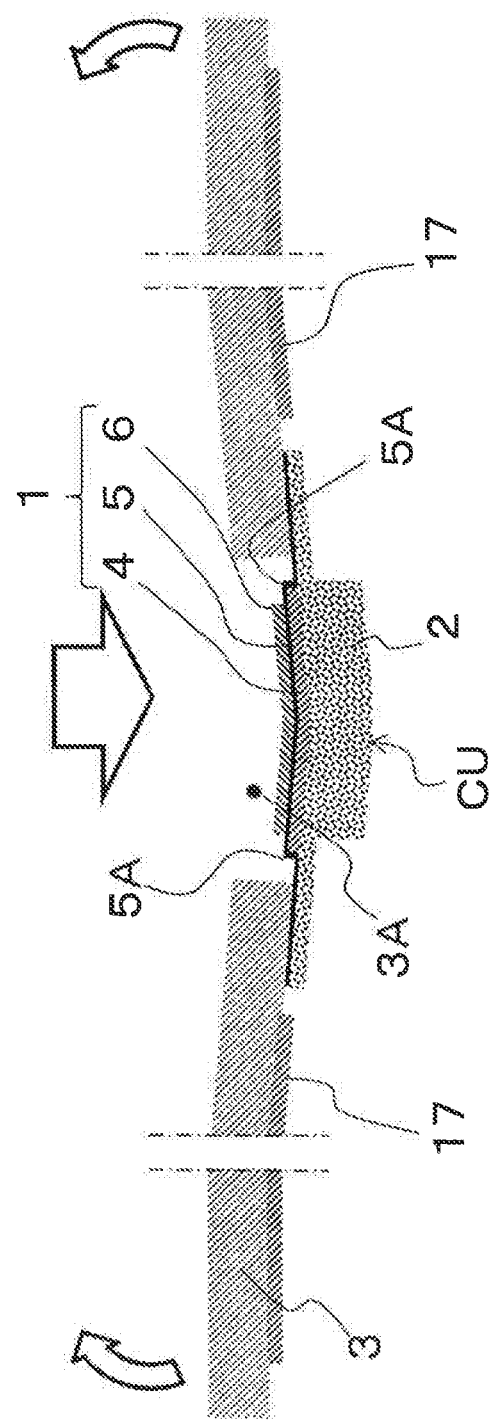
FIG. 7B is a cross-sectional view illustrating deformation of the cell unit at the time of thermal expansion.

FIG. 7A and FIG. 7B illustrate a fourth embodiment of the cell unit of the present invention. The cell unit CU illustrated in the figure has a basic configuration similar to that of the third embodiment but differs in that the surface on the electrode side (upper surface in the figure) of the support plate 2 and the surface on the cell structure 1 side (lower surface in the figure) of the frame 3 are joined together.

When this cell unit CU is exposed to high temperature environment during operation, as illustrated in FIG. 7B, the support plate 2 curves in a way that the cell structure 1 is on the inner side of the curve, and the frame 3 also curves in a way that the cell structure 1 is on the inner side of the curve, accordingly.

As in the case of the third embodiment, this cell unit CU also has a structure in which a sufficient mechanical strength is secured by the support plate 2 and the frame 3. Moreover, in the cell unit CU, the risk of concentration of tensile stress on the electrolyte layer 5 at the time of thermal expansion during operation is removed without reducing the strength of the frame 3, whereby occurrence of a crack and the like in the electrolyte layer 5 is prevented beforehand.

Fifth Embodiment

Figure 8A:
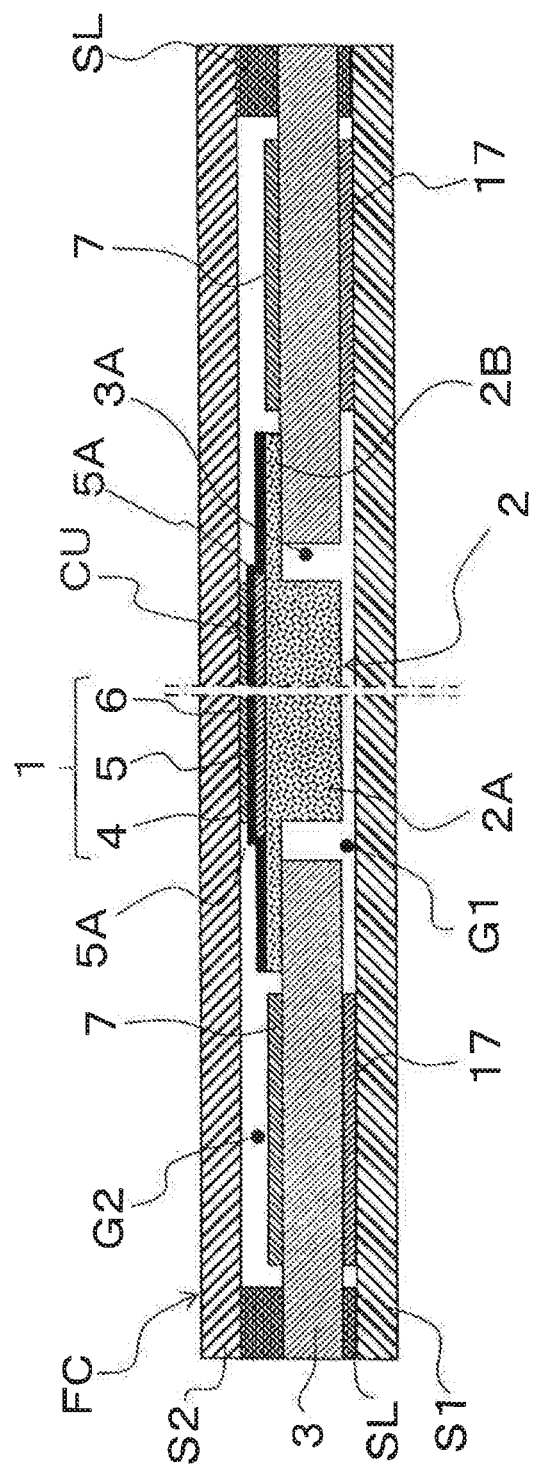
FIG. 8A is a cross-sectional view of the main part of the fuel cell for illustrating a fifth embodiment of the cell unit according to the present invention.
Figure 8B:
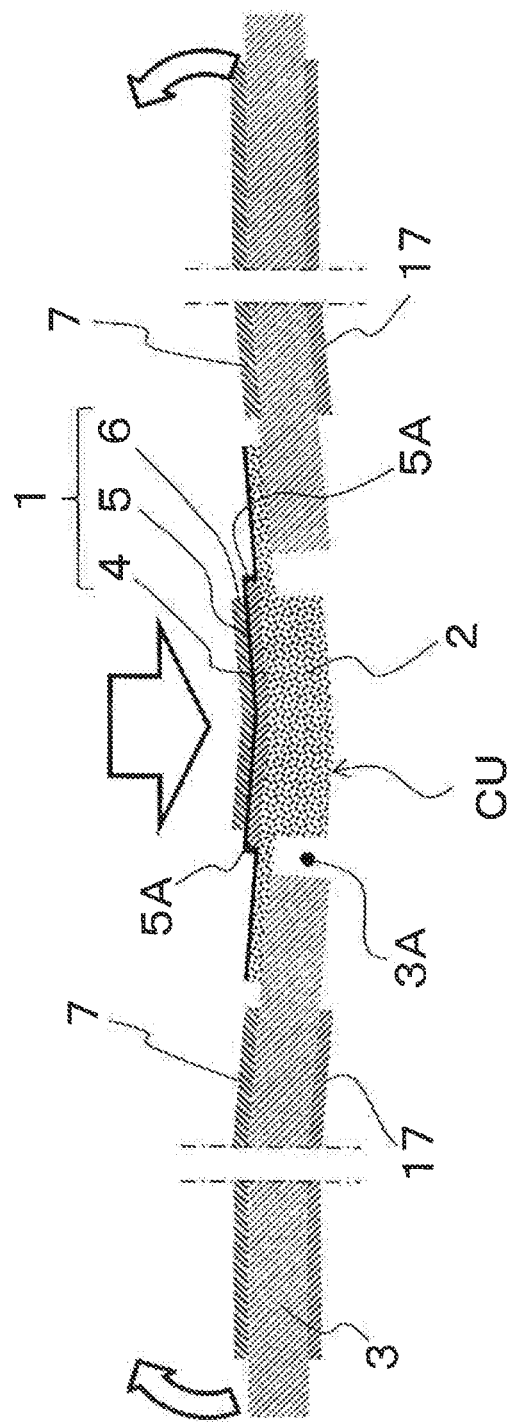
FIG. 8B is a cross-sectional view illustrating deformation of the cell unit at the time of thermal expansion.

FIG. 8A and FIG. 8B illustrate a fifth embodiment of the cell unit of the present invention. In the cell unit CU illustrated in the figure, the displacement guide 7 having the coefficient of thermal expansion smaller than that of the frame 3 is disposed on the surface on the cell structure 1 side (upper surface in the figure) of the frame 3. Moreover, in this cell unit CU, the displacement guide 17 having the coefficient of thermal expansion greater than that of the frame is disposed on the surface opposite to the surface of the frame 3 on which the cell structure 1 is disposed (lower surface in the figure). That is, the cell unit CU of this embodiment includes the displacement guides 7 and 17 on both surfaces of the frame 3, respectively.

When this cell unit CU is exposed to high temperature environment during operation, as illustrated in FIG. 8B, the support plate 2 curves in a way that the cell structure 1 is on the inner side of the curve, and the frame 3 also curves in a way that the cell structure 1 is on the inner side of the curve, accordingly. Thus, the cell unit CU has a structure in which a sufficient mechanical strength is secured by the support plate 2 and the frame 3. Moreover, in the cell unit CU, the risk of concentration of tensile stress on the electrolyte layer 5 at the time of thermal expansion during operation is removed without reducing the strength of the frame 3, whereby occurrence of a crack and the like in the electrolyte layer 5 can be prevented beforehand.

In addition, in this cell unit CU, the displacement guide 7 having the coefficient of thermal expansion smaller than that of the frame 3 and the displacement guide 17 having the coefficient of thermal expansion greater than that of the frame 3 are disposed on the mutually opposing surfaces so that the frame 3 will curve in a way that the cell structure 1 is on the concave side (on the inner side). Therefore, in this cell unit CU, even when materials having small differences in coefficient of thermal expansion with respect to the frame 3 are used for the displacement guides 7 and 17, the frame 3 can be sufficiently deformed. Thus, as for the displacement amount of the frame 3, the degree of freedom of design can be greatly increased.

Sixth Embodiment

Figure 9A:
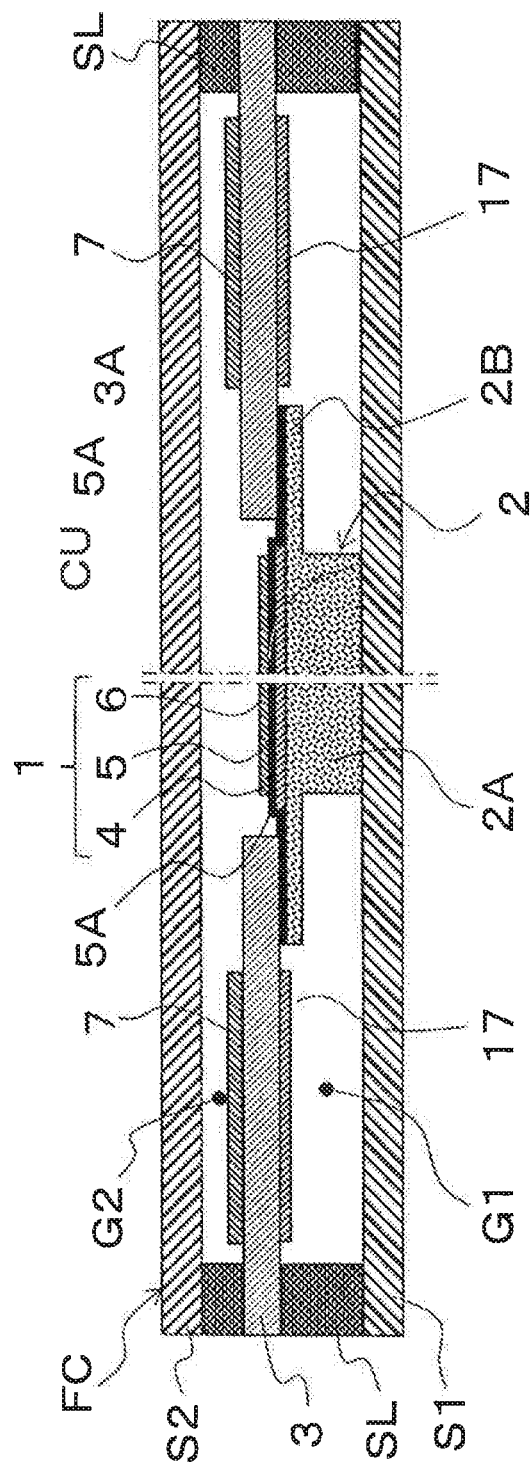
FIG. 9A is a cross-sectional view of the main part of the fuel cell for illustrating a sixth embodiment of the cell unit according to the present invention.
Figure 9B:
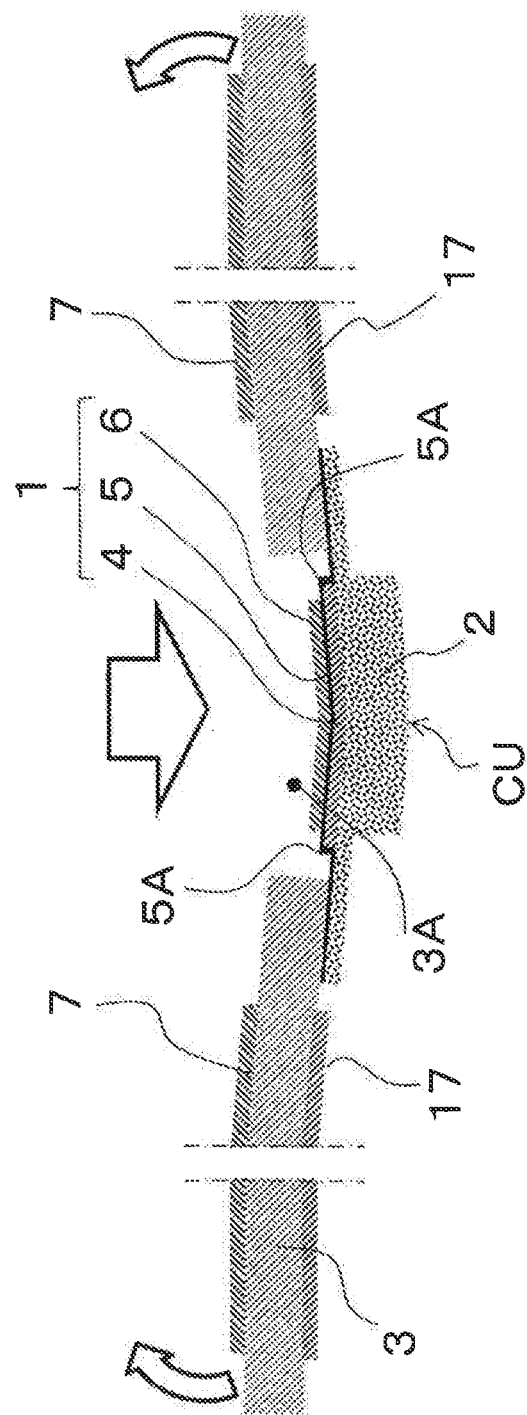
FIG. 9B is a cross-sectional view illustrating deformation of the cell unit at the time of thermal expansion.

FIG. 9A and FIG. 9B illustrate a sixth embodiment of the cell unit of the present invention. The cell unit CU of this embodiment has a basic configuration similar to that of the fifth embodiment, while the surface on the electrode side (upper surface in the figure) of the support plate 2 and the surface on the cell structure 1 side (lower surface in the figure) of the frame 3 are joined together.

When the cell unit CU with such a configuration is exposed to high temperature environment during operation, as illustrated in FIG. 9B, the support plate 2 curves in a way that the cell structure 1 is on the inner side of the curve, and the frame 3 also curves in a way that the cell structure 1 is on the inner side of the curve, accordingly. Thus, the cell unit CU has a structure in which a sufficient mechanical strength is secured by the support plate 2 and the frame 3. Moreover, in the cell unit CU, the risk of concentration of tensile stress on the electrolyte layer 5 at the time of thermal expansion during operation is removed without reducing the strength of the frame 3, whereby occurrence of a crack and the like in the electrolyte layer 5 can be prevented beforehand.

In addition, in this cell unit CU, the displacement guide 7 having the coefficient of thermal expansion smaller than that of the frame 3 and the displacement guide 17 having the coefficient of thermal expansion greater than that of the frame 3 are disposed on the mutually opposing surfaces. Therefore, even when the displacement guides 7 and 17 having small differences in coefficient of thermal expansion with respect to the frame 3 are used, the frame 3 can be sufficiently deformed. Thus, as for the displacement amount of the frame 3, the degree of freedom of design can be greatly increased.

Seventh Embodiment

Figure 10A:
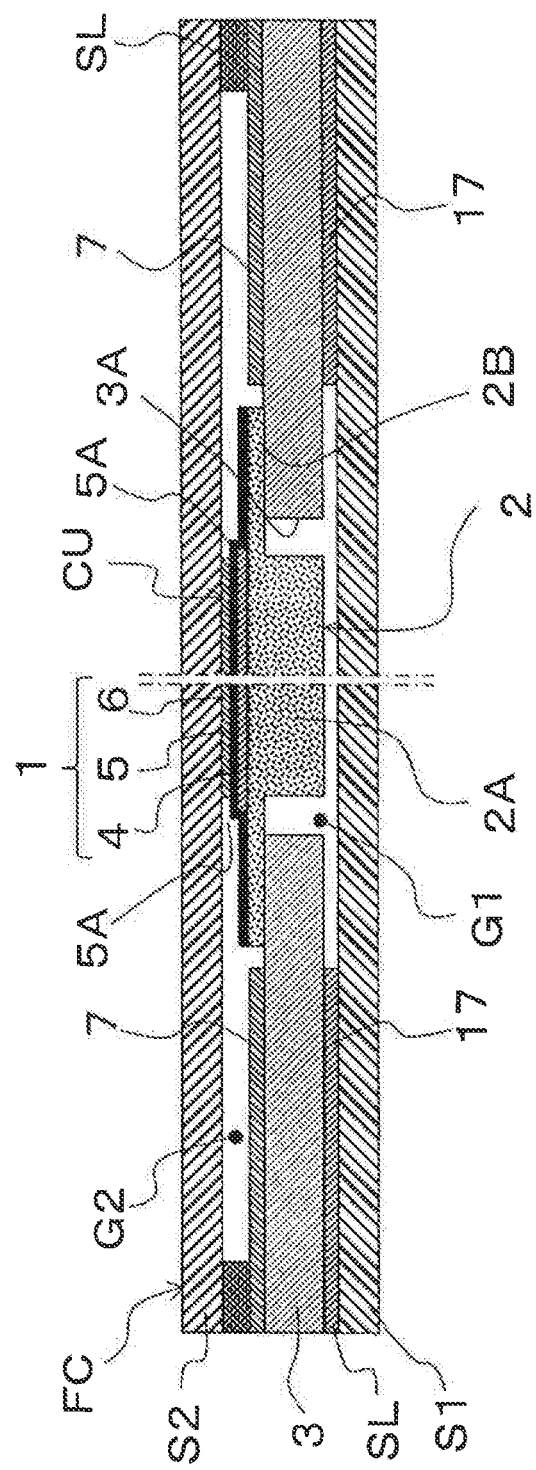
FIG. 10A is a cross-sectional view of the main part of the fuel cell for illustrating a seventh embodiment of the cell unit according to the present invention.
Figure 10B:
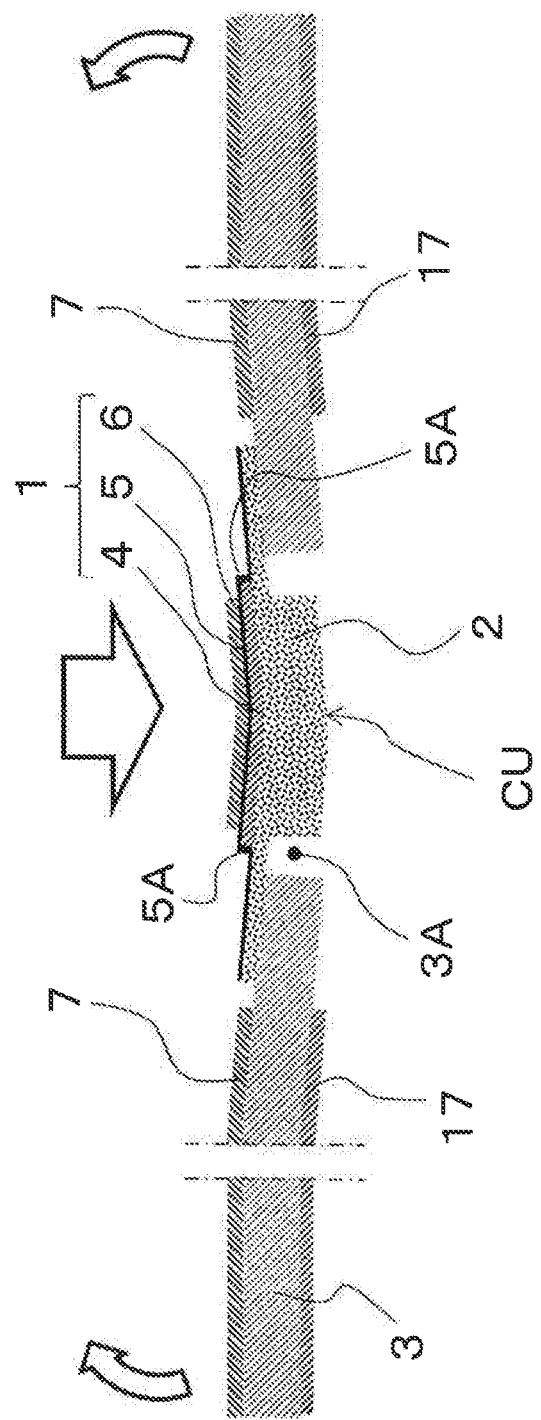
FIG. 10B is a cross-sectional view illustrating deformation of the cell unit at the time of thermal expansion.

FIG. 10A and FIG. 10B illustrate a seventh embodiment of the cell unit of the present invention. The cell unit CU illustrated in the figure has a basic configuration similar to that of the fifth embodiment (FIG. 8A and FIG. 8B), while the displacement guides 7 and 17 are disposed in areas containing the outer peripheral end part of the frame 3. In this case, the fuel cell FC illustrated in FIG. 10A has the displacement guide 7 interposed between the sealing part SL and the frame 3.

Although the cell unit CU illustrated in the figure has the displacement guides 7 and 17 disposed on both surfaces of the frame 3, according to the gist of this embodiment, either one of the displacement guides 7 and 17 may be provided and disposed in an area ranging to the outer peripheral end part of the frame 3.

When this cell unit CU is exposed to high temperature environment during operation, as illustrated in FIG. 10B, the support plate 2 curves in a way that the cell structure 1 is on the inner side of the curve, and the frame 3 also curves in a way that the cell structure 1 is on the inner side of the curve, accordingly. Thus, the cell unit CU has a structure in which a sufficient mechanical strength is secured by the support plate 2 and the frame 3. Moreover, in the cell unit CU, the risk of concentration of tensile stress on the electrolyte layer 5 at the time of thermal expansion during operation is removed without reducing the strength of the frame 3, whereby occurrence of a crack and the like in the electrolyte layer 5 can be prevented beforehand.

This cell unit CU has the displacement guides 7 and 17 disposed in the area containing the outer peripheral end part of the frame 3. Therefore, in forming the displacement guides 7 and 17 by applying metal materials to the frame 3, the number of the masked parts of a main surface of the frame 3 can be small, whereby the displacement guides 7 and 17 are formed at low cost.

Moreover, the cell unit CU has a small exposed area of the frame 3 due to the extended areas of the displacement guides 7 and 17, whereby evaporation of chromium (Cr) from the frame 3 is suppressed, and deterioration of the electrode due to chromium is very effectively prevented.

Eighth Embodiment

Figure 11A:
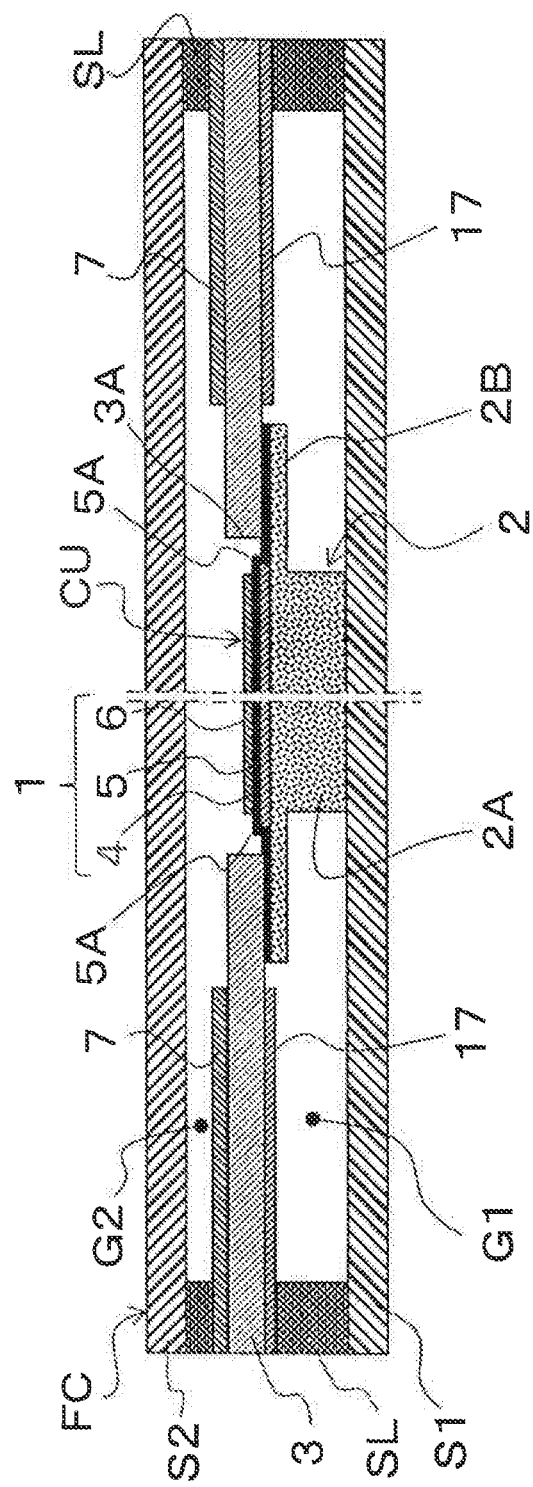
FIG. 11A is a cross-sectional view of the main part of the fuel cell for illustrating an eighth embodiment of the cell unit according to the present invention.
Figure 11B:
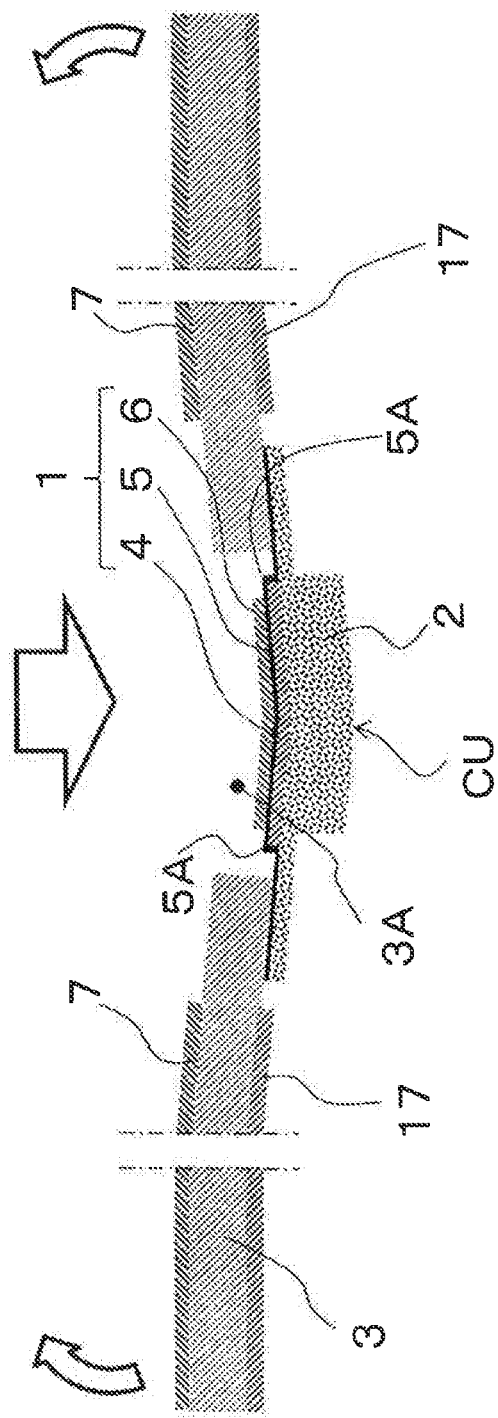
FIG. 11B is a cross-sectional view illustrating deformation of the cell unit at the time of thermal expansion.

FIG. 11A and FIG. 11B illustrate an eighth embodiment of the cell unit of the present invention. The cell unit CU illustrated in the figure has a basic configuration similar to that of the seventh embodiment but differs in that the surface on the electrode side (upper surface in the figure) of the support plate 2 and the surface on the cell structure 1 side (lower surface in the figure) of the frame 3 are joined together.

When this cell unit CU is exposed to high temperature environment during operation, as illustrated in FIG. 11B, the support plate 2 curves in a way that the cell structure 1 is on the inner side of the curve, and the frame 3 also curves in a way that the cell structure 1 is on the inner side of the curve, accordingly.

As in the case of the seventh embodiment, this cell unit CU also has a structure in which a sufficient mechanical strength is secured by the support plate 2 and the frame 3. Moreover, in the cell unit CU, the risk of concentration of tensile stress on the electrolyte layer 5 at the time of thermal expansion during operation is removed without reducing the strength of the frame 3, whereby occurrence of a crack and the like in the electrolyte layer 5 can be prevented beforehand.

The cell unit CU has the displacement guides 7 and 17 that are disposed in the areas containing the outer peripheral end part of the frame 3, thereby having extended areas of the displacement guides 7 and 17. Therefore, in forming the displacement guides 7 and 17 by applying metal materials, the number of the masked parts can be small, whereby the displacement guides 7 and 17 are formed at low cost. Moreover, the cell unit CU has a small exposed area of the frame 3, whereby evaporation of chromium (Cr) from the frame 3 is suppressed, and deterioration of the electrode due to chromium is very effectively prevented.

Ninth Embodiment

Figure 12A:
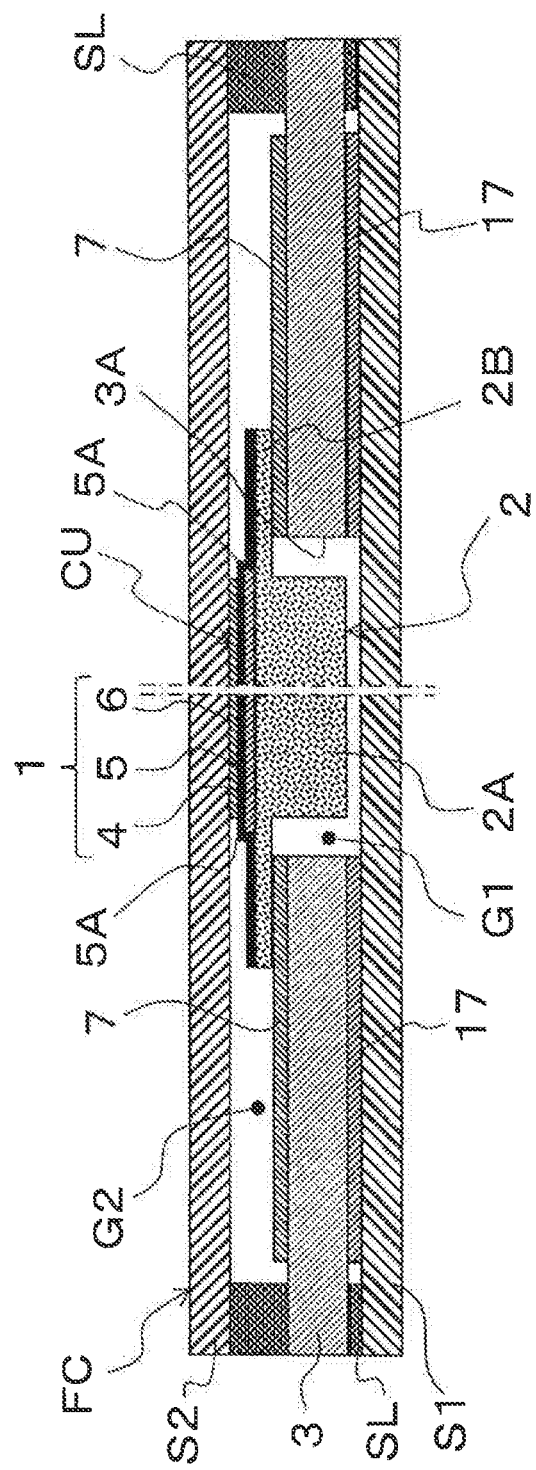
FIG. 12A is a cross-sectional view of the main part of the fuel cell for illustrating a ninth embodiment of the cell unit according to the present invention.
Figure 12B:
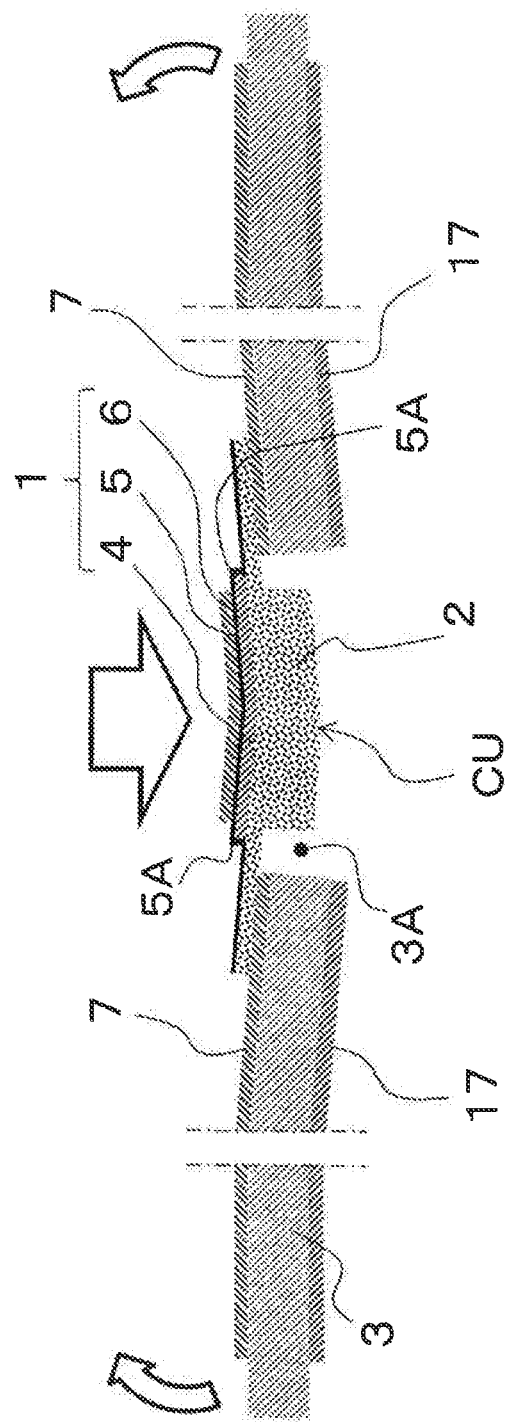
FIG. 12B is a cross-sectional view illustrating deformation of the cell unit at the time of thermal expansion.

FIG. 12A and FIG. 12B illustrate a ninth embodiment of the cell unit of the present invention. The cell unit CU illustrated in the figure has a basic configuration similar to that of the eighth embodiment (FIG. 11A and FIG. 11B) but differs in that the displacement guides 7 and 17 are disposed in areas containing an inner peripheral end part of the frame 3.

Although the cell unit CU illustrated in the figure has the displacement guides 7 and 17 disposed on both surfaces of the frame 3, according to the gist of this embodiment, either one of the displacement guides 7 and 17 may be provided and disposed in an area ranging to the inner peripheral end part of the frame 3.

When this cell unit CU is exposed to high temperature environment during operation, as illustrated in FIG. 12B, the support plate 2 curves in a way that the cell structure 1 is on the inner side of the curve, and the frame 3 also curves in a way that the cell structure 1 is on the inner side of the curve, accordingly. Thus, the cell unit CU has a structure in which a sufficient mechanical strength is secured by the support plate 2 and the frame 3. Moreover, in the cell unit CU, the risk of concentration of tensile stress on the electrolyte layer 5 at the time of thermal expansion during operation is removed without reducing the strength of the frame 3, whereby occurrence of a crack and the like in the electrolyte layer 5 can be prevented beforehand.

This cell unit CU has the displacement guides 7 and 17 that are disposed in the areas containing the inner peripheral end part of the frame 3, thereby having extended areas of the displacement guides 7 and 17. Therefore, in forming the displacement guides 7 and 17 by applying metal materials to the frame 3, the number of the masked parts of the main surface of the frame 3 can be small, whereby the displacement guides 7 and 17 are formed at low cost. Moreover, the cell unit CU has a small exposed area of the frame 3 due to the extended areas of the displacement guides 7 and 17, whereby evaporation of chromium (Cr) from the frame 3 is suppressed, and deterioration of the electrode due to chromium is very effectively prevented.

Furthermore, in this cell unit CU, in which the displacement guides 7 and 17 are disposed in the areas containing the inner peripheral end part of the frame 3, the frame 3 easily follows the deformation of the support plate 2, and the entire frame 3 curves, whereby a tensile load on the electrolyte layer 5 is further effectively suppressed.

Tenth Embodiment

Figure 13A:
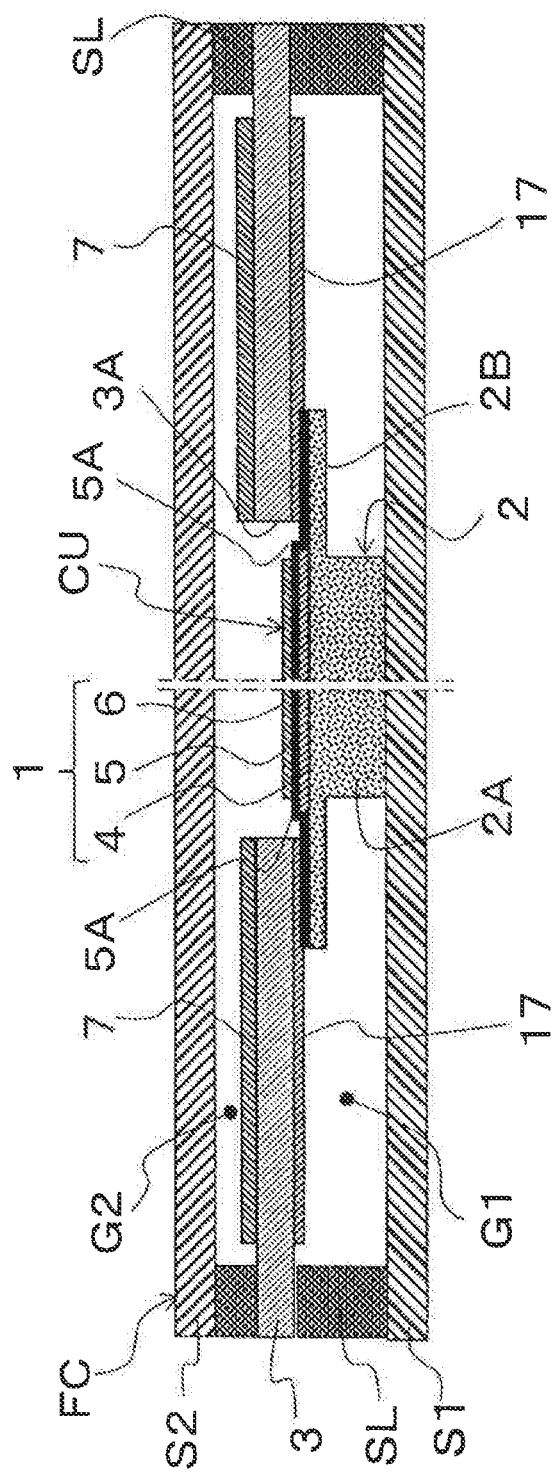
FIG. 13A is a cross-sectional view of the main part of the fuel cell for illustrating a tenth embodiment of the cell unit according to the present invention.
Figure 13B:
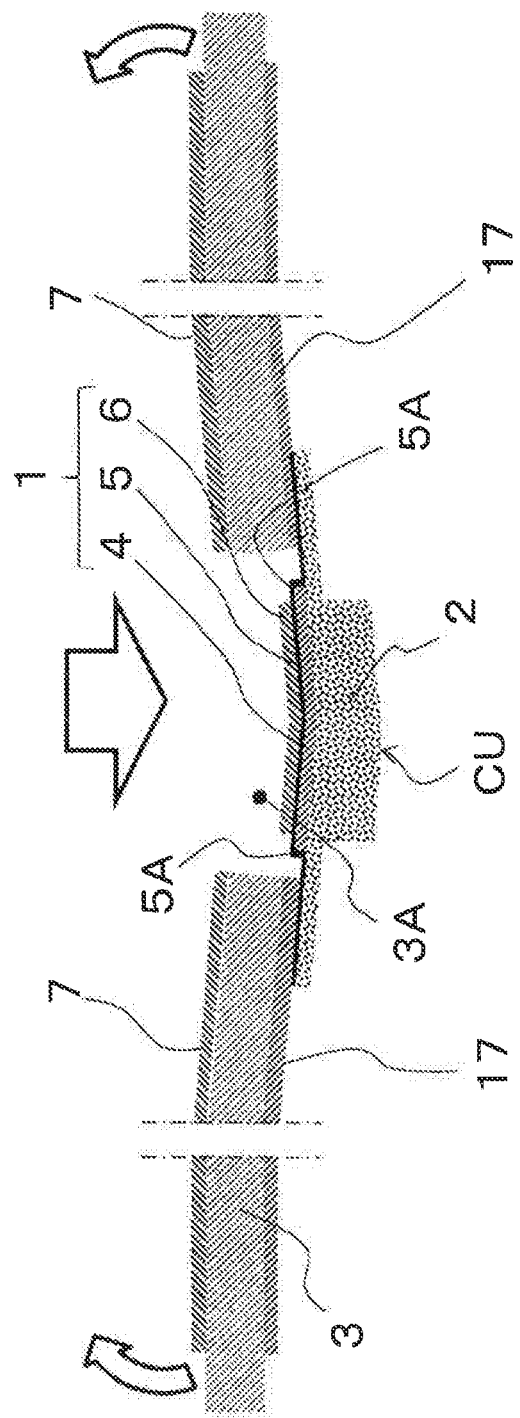
FIG. 13B is a cross-sectional view illustrating deformation of the cell unit at the time of thermal expansion.

FIG. 13A and FIG. 13B illustrate a tenth embodiment of the cell unit of the present invention. The cell unit CU illustrated in the figure has a basic configuration similar to that of the ninth embodiment but differs in that the surface on the electrode side (upper surface in the figure) of the support plate 2 and the surface on the cell structure 1 side (lower surface in the figure) of the frame 3 are joined together.

When this cell unit CU is exposed to high temperature environment during operation, as illustrated in FIG. 13B, the support plate 2 curves in a way that the cell structure 1 is on the inner side of the curve, and the frame 3 also curves in a way that the cell structure 1 is on the inner side of the curve, accordingly.

As in the case of the ninth embodiment, this cell unit CU also has a structure in which a sufficient mechanical strength is secured by the support plate 2 and the frame 3. Moreover, in the cell unit CU, the risk of concentration of tensile stress on the electrolyte layer 5 at the time of thermal expansion during operation is removed without reducing the strength of the frame 3, whereby occurrence of a crack and the like in the electrolyte layer 5 can be prevented beforehand.

The cell unit CU has the displacement guides 7 and 17 that are disposed in the areas containing the inner peripheral end part of the frame 3, thereby having extended areas of the displacement guides 7 and 17. Therefore, in forming the displacement guides 7 and 17 by applying metal materials, the masked areas can be small, whereby the displacement guides 7 and 17 are formed at low cost. Moreover, the cell unit CU has a small exposed area of the frame 3, whereby evaporation of chromium (Cr) from the frame 3 is suppressed, and deterioration of the electrode due to chromium is very effectively prevented.

Furthermore, in this cell unit CU, in which the displacement guides 7 and 17 are disposed in the areas containing the inner peripheral end part of the frame 3, the frame 3 easily follows the deformation of the support plate 2, and the entire frame 3 curves, whereby a tensile load on the electrolyte layer 5 is further effectively suppressed.

The configuration of the fuel cell according to the present invention is not limited only to those in the foregoing embodiments but can be modified or changed appropriately within the gist of the present invention, or the configurations of the foregoing embodiments can be combined.

REFERENCE SIGNS LIST

CU Cell unit
FC Fuel cell
S1 Anode-side separator
S2 Cathode-side separator
SL Sealing part
1 Cell structure
2 Support plate
3 Frame
4 Anode electrode layer
5 Electrolyte layer
6 Cathode electrode layer
7 Displacement guide
17 Displacement guide

The invention claimed is:

1. A cell unit comprising:
   a cell structure having a lamination of an anode electrode layer, an electrolyte layer, and a cathode electrode layer in this order;
   a metal support plate disposed on one side surface of the cell structure; and
   a frame holding an outer peripheral part of the support plate,
   wherein a coefficient of thermal expansion of the support plate is greater than that of the cell structure,
   the frame includes a displacement guide at least on one side surface of the frame, the displacement guide has a coefficient of thermal expansion that is different from a coefficient of thermal expansion of the frame and the displacement guide makes the frame curve so that the cell structure is concaved in accompany with thermal expansion, and
   a displacement amount of the frame having the displacement guide at the time of thermal expansion is equal to or less than a displacement amount of the support plate at the time of thermal expansion.

2. The cell unit according to claim 1, wherein the displacement guide has a coefficient of thermal expansion smaller than a coefficient of thermal expansion of the frame and is provided on a surface of a side of the frame on which the cell structure is disposed.

3. The cell unit according to claim 2, wherein the displacement guide is disposed in an area containing an outer peripheral end part of the frame.

4. The cell unit according to claim 2, wherein the displacement guide is disposed in an area containing an inner peripheral end part of the frame.

5. The cell unit according to claim 2, wherein the displacement guide is formed of an insulating oxide material.

6. A fuel cell comprising:
   the cell unit according to claim 2;
   separators disposed on each of an anode side and a cathode side of the cell unit; and
   a sealing part that air-tightly seals a space between an outer peripheral end part of a frame of the cell unit and an outer peripheral end part of the separators.

7. The cell unit according to claim 1, wherein the displacement guide has a coefficient of thermal expansion greater than a coefficient of thermal expansion of the frame and is provided on a surface opposite to a side of the frame on which the cell structure is disposed.

8. The cell unit according to claim 1, wherein the displacement guide is disposed in an area containing an outer peripheral end part of the frame.

9. The cell unit according to claim 8, wherein the displacement guide has a coefficient of thermal expansion greater than a coefficient of thermal expansion of the frame and is provided on a surface opposite to a side of the frame on which the cell structure is disposed.

10. The cell unit according to claim 1, wherein the displacement guide is disposed in an area containing an inner peripheral end part of the frame.

11. The cell unit according to claim 1, wherein the displacement guide is formed of an insulating oxide material.

12. A fuel cell comprising:
   the cell unit according to claim 1;
   separators disposed on each of an anode side and a cathode side of the cell unit; and
   a sealing part that air-tightly seals a space between an outer peripheral end part of a frame of the cell unit and an outer peripheral end part of the separators.

* * * * *